June 10, 1958
C. R. PETTIS, JR
2,838,176
CHECK-WEIGHING MECHANISM
Filed Nov. 20, 1951
4 Sheets-Sheet 1
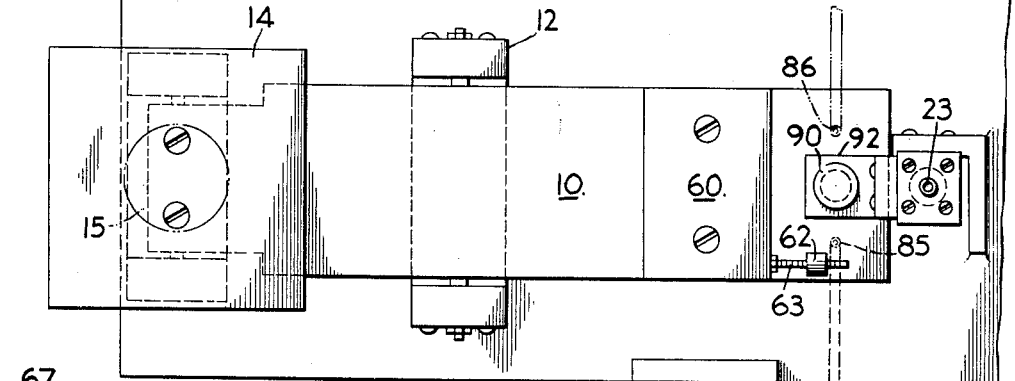
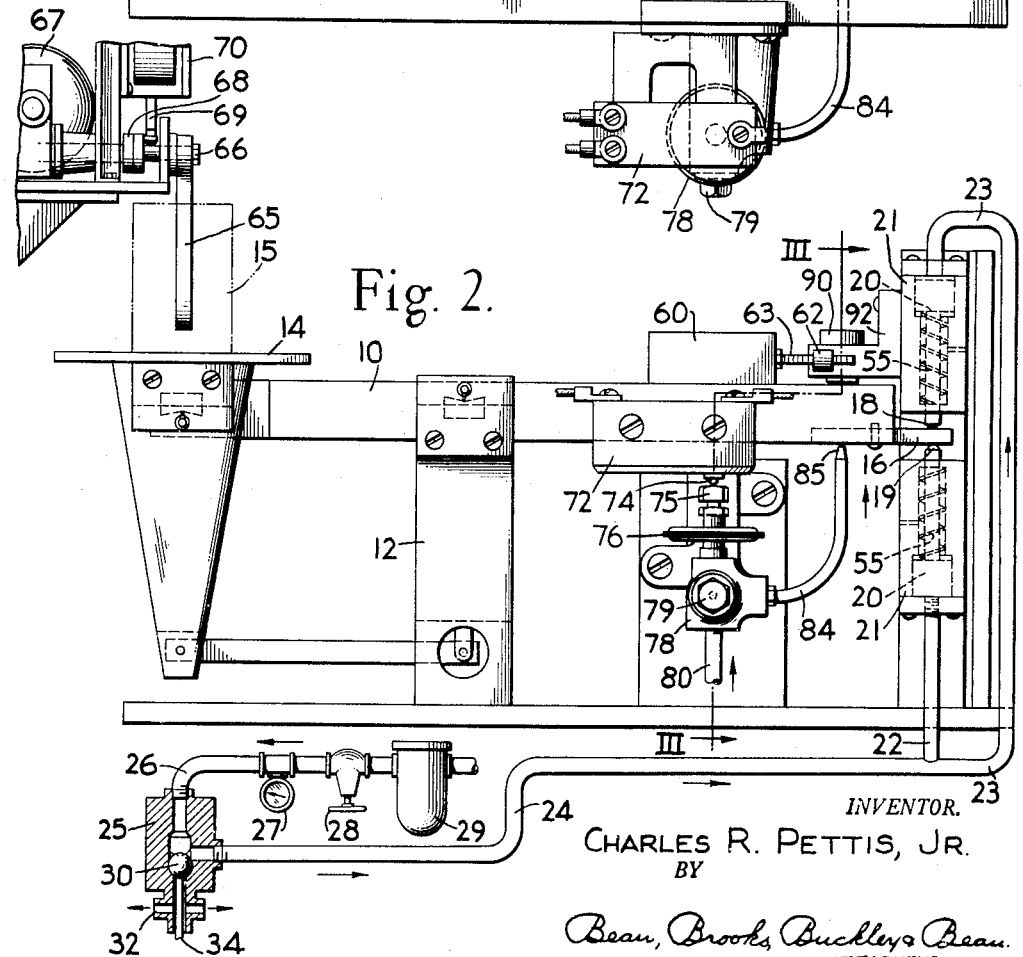
INVENTOR.
CHARLES R. PETTIS, JR.
BY
Bean, Brooks, Buckley & Bean
ATTORNEYS June 10, 1958  C. R. PETTIS, JR  2,838,176
CHECK-WEIGHING MECHANISM
Filed Nov. 20, 1951  4 Sheets-Sheet 2
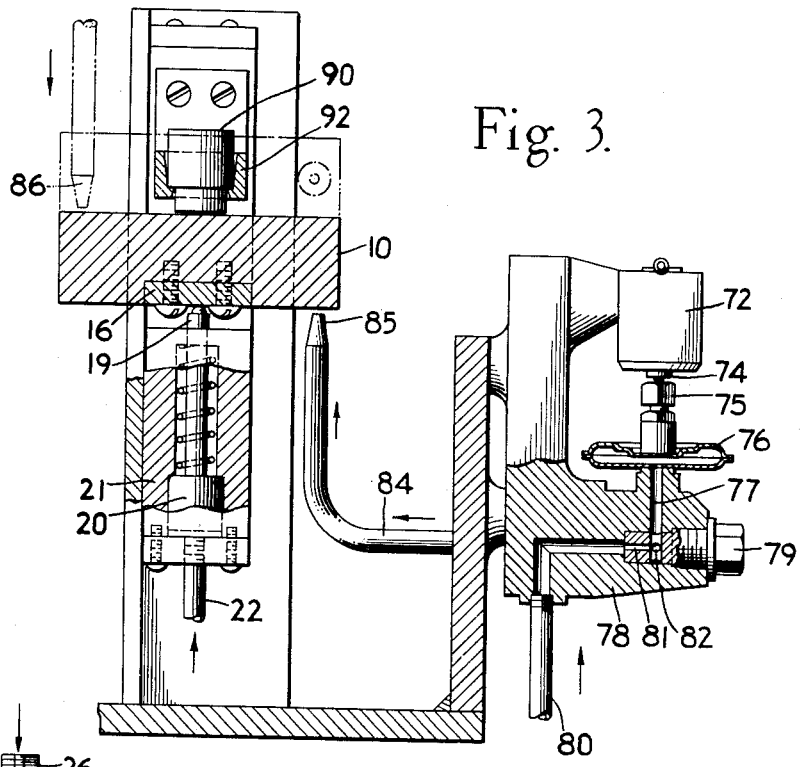
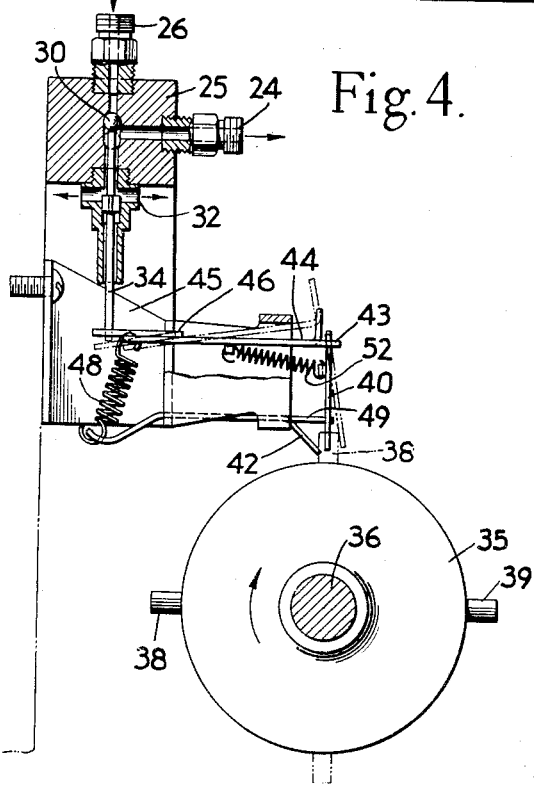
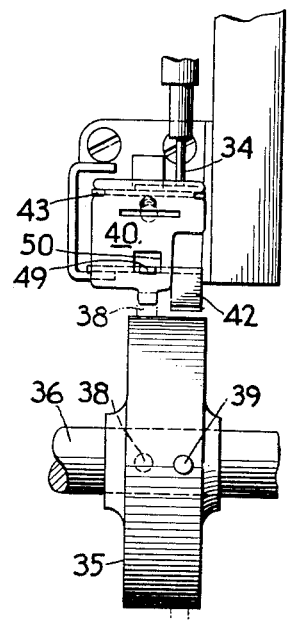
INVENTOR.
CHARLES R. PETTIS, JR.
BY
Bean, Brooks, Buckley & Bean
ATTORNEYS June 10, 1958

C. R. PETTIS, JR 2,838,176

CHECK-WEIGHING MECHANISM

Filed Nov. 20, 1951

INVENTOR.
CHARLES R. PETTIS, JR.
BY
Bean, Brooks, Buckley & Bean.
ATTORNEYS

June 10, 1958  C. R. PETTIS, JR  2,838,176
CHECK-WEIGHING MECHANISM
Filed Nov. 20, 1951  4 Sheets-Sheet 4

INVENTOR.
CHARLES R. PETTIS, JR.
BY
Bean, Brooks, Buckley & Bean.
ATTORNEYS

United States Patent Office 2,838,176
Patented June 10, 1958

2,838,176

CHECK-WEIGHING MECHANISM

Charles R. Pettis, Jr., Watkins Glen, N. Y., assignor to International Salt Company, Inc., Scranton, Pa.

Application November 20, 1951, Serial No. 257,316

14 Claims. (Cl. 209—121)

This invention relates to weighing machines, and more particularly to machines for "check-weighing" packages or articles during movement thereof from a production line or the like. The invention is particularly useful in relatively high speed classification of any objects by weight, so as to enable the separation of overweight or underweight objects from objects of correct weight, and/or to adjust the weight control mechanism, as for example in a package filling operation so as to insure uniform filling of packages to correct weight. Thus, the invention is applicable to, and is illustrated and described hereinafter for example in a device designed to check the weights of packages or other articles delivered from a conveyor belt, and rejecting any such packages as may be underweight or overweight.

It is a particular object of the present invention to provide a mechanism for the purposes aforesaid which is adapted to operate entirely automatically and with increased speed and accuracy compared to prior devices designed for similar purposes.

Another object of the invention is to provide a mechanism as aforesaid which will perform accurately and consistently at higher rates of operation.

Another object of the invention is to provide a mechanism as aforesaid which may be relatively inexpensively constructed, and which is rugged and mechanically simple, thereby requiring minimum maintenance attention.

Other objects of the invention will appear from the specification hereinafter.

In the drawing:

Fig. 1 is a fragmentary plan view of a mechanism of the invention;

Fig. 2 is a fragmentary side elevation thereof;

Fig. 3 is a fragmentary section, on an enlarged scale, taken along line III—III of Fig. 2;

Fig. 4 is an elevation, with portions shown in section, of an extension of the mechanism of Fig. 2, showing a control device thereof;

Fig. 5 is an end elevation of the mechanism of Fig. 4;

Figure 6:
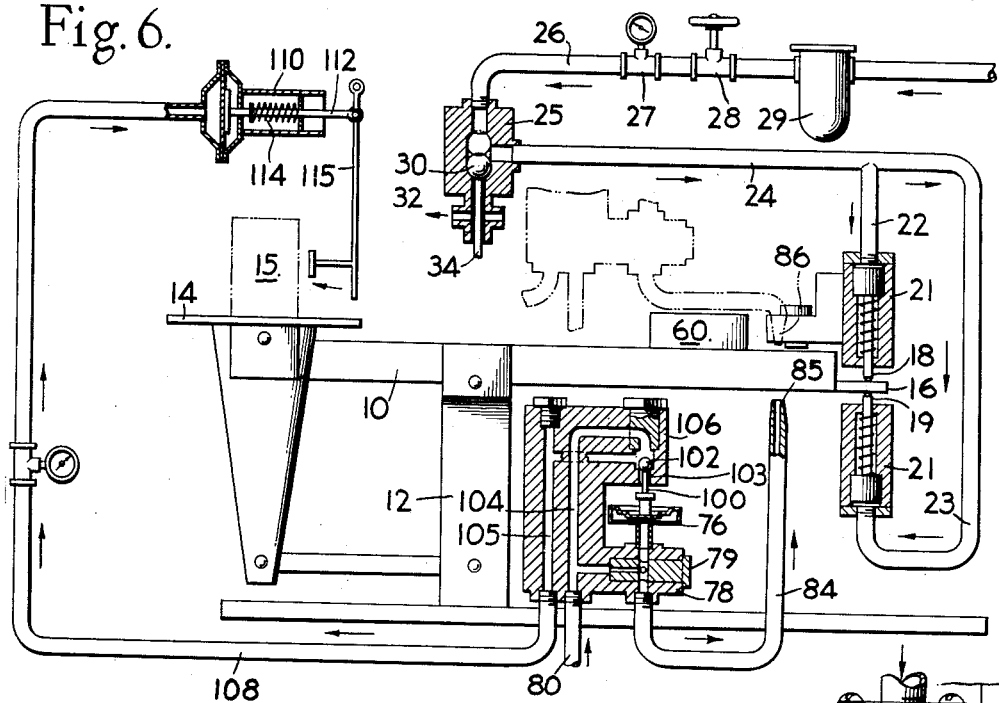
Fig. 6 is a schematic elevation, with portions shown in section, of a modified form of the mechanism of the invention.

An apparatus of the invention is illustrated by way of one example thereof in Figs. 1–5 to include a weighing machine of the balance beam type; having a balance beam 10 pivotally mounted as upon a fulcrum post 12 and carrying at one end a weighing tray 14 onto which packages or other objects to be check-weighed may be placed and successively replaced by any suitable means such as a conveyor belt, gravity chute, or the like. Thus, it is contemplated that any suitable means may be employed for successively bringing packages or other objects to be weight-checked into resting position upon the weighing tray 14, and then subsequently displacing the weight-checked object from the weighing tray by any suitable means incidental to replacement thereof by another article to be weight-checked.

As shown in Figs. 1, 2, provision is made for normally locking the balance beam 10 in its balanced or inoperative position, and for momentarily releasing the beam subsequent to placement of each object to be weighed into correct weighing position on the tray. To this end a control plate 16 is mounted to extend rigidly from the end of the balance beam opposite to the position of the weighing tray 14 thereon, and holding pins 18, 19 are arranged to releasably press against the opposite upper and lower surfaces of the arm 16. The pins 18, 19 are coupled to or formed integrally with corresponding pistons 20—20 carried within corresponding air cylinders 21, 21, which are supplied with air under pressure through conduits 22, 23 from a common conduit 24. The conduit 24 connects to one port of a three-way valve 25 (Figs. 2, 4) which is supplied with compressed air through a conduit 26 including a suitable pressure gauge 27; a pressure regulator 28; and a filter 29, whereby a supply of clean filtered air under constant pressure is at all times available to the valve 25.

The armature of the valve 25 is indicated as being in the form of a ball 30 which is movable within the valve chamber so as to alternately intercommunicate the supply conduit 24 with the air supply conduit 26 and an air discharge port 32 formed in the valve structure. Thus, in response to the force of the air pressure supply the ball 30 normally resides in the lowered position thereof shown in Fig. 2 whereby air pressure will be imposed on the holding pins 18, 19. However, to cause the ball 30 to be lifted to release the pressure on the pins a push rod 34 is disposed within the air discharge port of the valve member and arranged for bearing upwardly against the ball 30 when actuated to do so. Thus, as will be explained more fully hereinafter, the ball 30 may be moved upwardly from the position thereof shown in Fig. 2 as to the position thereof shown in Fig. 4, as in response for example to operation of a cam 35 (Figs. 4–5).

It is to be understood that the valve of Fig. 4 may be of any other type and that the actuator device thereof may be arranged to be actuated by any suitable mechanism in synchronism with movements of packages or articles to be check-weighed to and from the weighing tray 14. However, in the example shown in Figs. 4–5 the cam member 35 is in the form of a wheel carried by a shaft 36 which may extend from or be driven by any suitable portion of the mechanism which moves the articles to be check-weighed successively onto the weighing tray 14. Pins 38—39 extend from the periphery of the cam wheel 35 at spaced positions thereon and are disposed respectively in registry with a hinged latch plate 40 and a ramp end portion 42 of a holding bar. The latch plate 40 is pivotally connected at 43 to the outer end of a rocker plate 44 which is fulcrumed upon a fixed bracket structure 45, as indicated at 46 (Fig. 4). A tension spring 48 is arranged to normally pull the rear end of the rocker plate 44 down as to the broken line position thereof in Fig. 4 whereby the valve ball 30 is in down position as shown in Fig. 2. Thus, the air pressure from the supply conduit 26 is admitted to the supply conduit 24 and thence into the air cylinders 21, 21 to force the holding pins into bearing positions against the balance beam plate 16 for locking the latter in inoperative balanced position.

However, whenever the cam 35 rotates so as to bring the cam pin 39 into bearing relation against the ramp portion 42 of a holding finger bar 49 the latter is lifted upwardly into such position that the hinge plate 40 may thereupon swing inwardly with an apertured portion 50 (Fig. 5) thereof disposed in latching engagement with the holding bar 49; a tension spring 52 being provided to facilitate this latching action. The pull of the spring 48 then causes the latch unit to swing downwardly as to the solid line position thereof shown in Fig. 4, thereby lifting the valve stem 34 upwardly so as to displace the valve ball 30 into the position thereof shown in Fig. 4. This action excommunicates the supply conduit 26 from the conduit 24 and intercommunicates the conduit 24 and the valve air discharge port 32, thereby freeing the piston devices which control the beam locking fingers 18—19. Compression springs 55, 55 are arranged within the cylinders 21, 21 to bias the locking pins 18—19 toward open positions; and thus it will be appreciated that upon operation of the pneumatic valve 25 so as to release the supply of compressed air on the pistons 20, 20, the holding pins 18—19 will withdraw from the plate 16, thereby momentarily freeing the balance beam to move in response to any condition of underweight or overweight of the package or article then resting upon the weighing tray 14. Then, upon further rotation of the cam device 35 the pin 38 thereof presses against the lower edge of the latch plate 40 so as to move it to the broken line position thereof shown in Fig. 4 whereupon it is released from the holding finger 49. The spring 48 thereupon acts to pull the left hand end of the rocker plate 44 down, thereby permitting the valve stem 34 and valve ball 30 to fall so as to again supply air pressure to the cylinders 21—21 to force the pins 18—19 into holding positions. Thus, the pins are driven to again lock the balance beam in centered position until such time as the object which has in the interim been check-weighed has been replaced on the weighing tray by another object to be check-weighed.

A counter weight, as indicated at 60 of preselected suitable mass is fastened to the balance beam 10 in such position as to balance the prescribed weight of the object to be checkweighed; and in order to facilitate minute adjustment of the counter weight effect the latter may be equipped if desired, with a supplemental counter weight 62 carried by a screw 63 so as to be adjustable thereon longitudinally of the balance beam. Thus, it will be appreciated that an object which has been previously determined to be of the exact weight prescribed therefor, may be placed upon the weighing tray 14 while the air valve 25 is adjusted to pin unlocking position. The counter weight 60 and/or the supplemental counter weight 62 may thereupon be adjusted longitudinally of the balance beam until such time as the beam plate 16 floats of its own accord in a centered position between the pins 18—19. The weighing apparatus is then in condition for checking the weights of articles in relation to the prescribed weights thereof. If the object being check-weighed is of the exact prescribed weight, the balance beam will not shift upon release of the pins 18—19. However, in event the object is underweight the weighing tray end of the balance beam will rise and the plate 16 will lower; but if the object is overweight the beam will pivot in opposite direction. In the case of a high speed check-weighing operation it may be necessary to further adjust the counter weight device as by manipulation of the screw held weight 62 in order that the test package will register proper weight when passing through the check-weighing apparatus.

The invention contemplates employment of such beam pivoting action as explained hereinabove in the case of either underweight or overweight conditions to cause either rejection from the production line of any such underweight or overweight objects or control of the package filling or object weight determining operation so as to provide the proper corrective factor thereto. As shown in Figs. 1–2, for example, the apparatus is arranged to control operation of a kick lever 65 disposed to push underweight or overweight objects laterally from the weighing tray 14 instead of permitting them to move on in the normal production delivery line. Thus, as shown in Fig. 2, the kick arm 65 may be carried by a shaft 66 having selective clutching to the output shaft of a continuously running electric gear motor 67; the clutch device being indicated at 68. Control for the clutch is shown as being by means of the plunger 69 of a solenoid device 70. Thus, the clutch 68 may be of the so-called "single revolution" type designed to provide for a single revolution of the kick arm whenever the solenoid 70 is energized in response to closing of an electric circuit controlled by motion of the balance beam 10, as explained hereinabove.

To control the solenoid circuit, a simple push-button or "micro-switch" as indicated at 72 may be mounted at any convenient location with the contact control button portion thereof disposed as indicated at 74. A push member 75 is then arranged to be carried by one end of a bellows or diaphragm 76 which is arranged to receive compressed air from a conduit 77 (Fig. 3) formed within triple port housing 78. The three ports of the housing 78 intercommunicate interiorly thereof at an inner chamber portion into which is threaded an orificed screw 79. The main port of the device is connected by means of a conduit 80 to any suitable supply of compressed air for supply of air under constant pressure to the throttling orifice 81 of the screw 79. A passageway 82 is arranged in communication with a tube 84 which extends into a position adjacent the bottom surface of the scale beam 10 and terminates in a reduced diameter nozzle portion 85 which is shaped and disposed to direct a jet of compressed air upwardly against the bottom surface of the scale beam 10.

The scale beam and the nozzle 85 are relatively arranged so that whenever the scale beam is in "balanced" or inoperative position there is a sufficient gap between the scale beam and the nozzle 85 to permit relatively free escape of compressed air through the nozzle 85. It should be noted that the orifice 81 is of a smaller diameter than the nozzle 85 so that the pressure inside the bellows 76 is normally minimum. However, it will be appreciated that upon lowering of the right hand end portion of the scale beam 10, as upon release of the locking pins 18—19 when an underweight object is disposed on the tray 14, the gap between the scale beam 10 and the nozzle 85 will be lessened, thereby imposing a throttling effect against the escape of compressed air through the nozzle 85. This results in development of an increased back pressure in the conduit 84, whereby a greater air pressure will build up in the diaphragm or bellows 76. Otherwise stated, the normal balance of pneumatic pressure forces within the pasageways of the housing 78 will be disturbed, whereby the interior of the bellows 76 will be subjected to increased pressure as a result of which the bellows will expand and the push member 75 will be forced upward so as to contact and actuate the control member 74 of the microswitch 72. As explained hereinabove this actuation of the microswitch energizes the solenoid 70, thereby initiating a one revolution engagement of the clutch 68 so as to cause the kick arm 65 to make one revolution for the purpose of pushing the underweight object 15 from the weighing tray 14.

As stated hereinabove, the invention is applicable with equal facility to the ejection of underweight and/or overweight objects, or to the adjustment of package filling or other weight determining mechanisms in response to either falling or rising of the right hand end portion of the balance beam 10. Thus, for example, a compressed air jet 86 (Figs. 1, 3) may be disposed above the right hand end portion of the balance beam 10 and coupled to a pneumatic-electric control arrangement for overweight operation of the reject lever 65, in the same manner as explained hereinabove in connection with control and operation of the underweight reject operation. Hence, to avoid unnecessary complication of the illustration and specification herein the appropriate duplicate mechanisms for control of the overweight reject system will not be shown and described.

If it is desired to provide for a slightly greater overweight than underweight tolerance, as when packaging foodstuffs for example, a supplemental counterweight as indicated at 90 may be arranged to be supported in a stationary holder 92 so as to normally reside at a position just above the top surface of the balance beam 10. The holder 92 is constructed however so that the weight 90 may be picked up by the balance beam 10 whenever the right hand end portion thereof rises in response to an overweight condition. Thus, the weight of the mass 90 will then add to the resistance beam tilting, and will regulate the overweight tolerance permitted by the mechanism before movement of the balance beam into such position relative to the jet 86 as to cause actuation of the reject or weight corrective mechanism of the device.

Fig. 6 illustrates another form of underweight-overweight reject control mechanism in a weighing machine of the invention. In Fig. 6 like numerals are used to indicate parts corresponding to those in the illustrations of Figs. 1–5; and it will be readily seen that the mechanism of Fig. 6 is identical to that of Figs. 1–5 except in the following respects. In Fig. 6 the pressure responsive bellows or diaphragm 76 is arranged to actuate a push rod 100 designed to unseat and lift a valve ball 102 which normally reclines and closes an air outlet port 103 while permitting intercommunication of air conduits 104—105 interiorly of a valve casing 106. The air passage 104 is in open communication with the compressed air supply conduit 80, and the air passageway 105 is in open communication with an air conduit 108 which leads to a pneumatic motor unit 110. The output rod 112 of the unit 110 is biased by means of a spring 114 toward retracted position, and the rod 112 is connected to actuate a linkage mechanism 115 in such manner that whenever the bellows 76 expands in response to lowering of the right hand end portion of the balance beam as explained hereinabove, the valve ball 102 will be thereupon lifted so as to relieve the air pressure in the conduit 108 through the discharge port 103. This permits the spring 114 of the cylinder unit 110 to contract the rod 112 within the cylinder to actuate the linkage 115 to cause rejection of the underweight package as indicated at 15. Thus, it will be appreciated that the mechanism of Fig. 6 comprises a fully pneumatic control system, and dispenses with need of any electrical apparatus or circuits such as are illustrated as being employed in connection with the arrangement of Figs. 1–5. A corresponding overweight reject control nozzle 86 and mechanism therefor are also shown in Fig. 6, as explained hereinabove.

Figure 7:
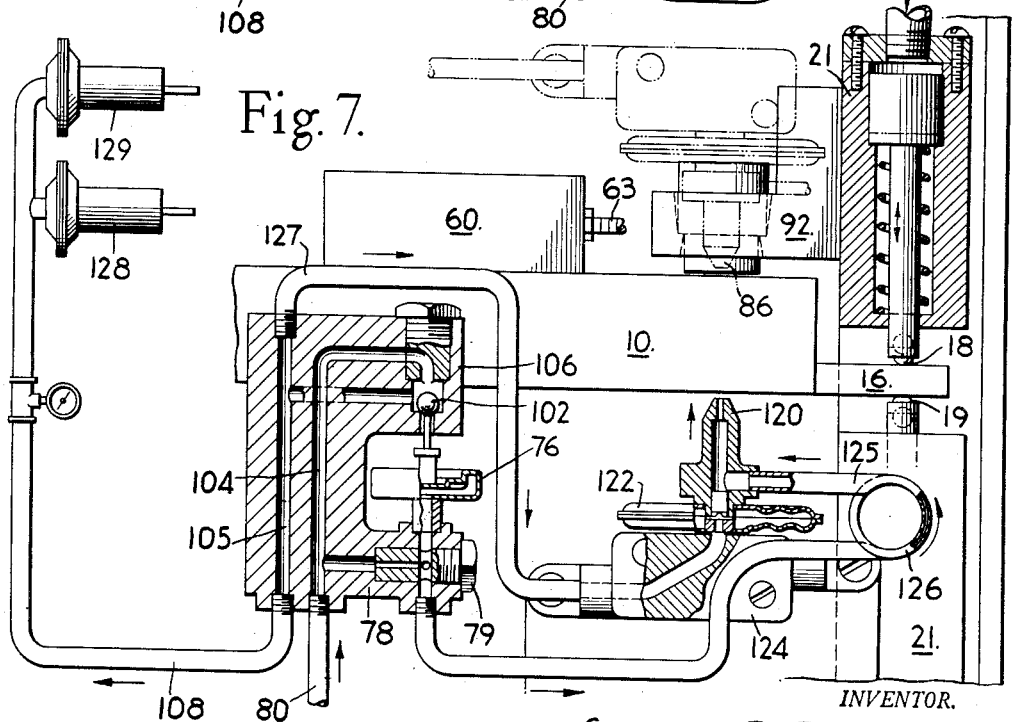
Fig. 7 is a fragmentary illustration of a further modified form of the control mechanism of the invention.

Fig. 7 illustrates a still further modification of the air jet actuated pneumatic reject control portion of the mechanism. In the case of Fig. 7, instead of a rigidly mounted jet nozzle 85 as illustrated in Figs. 1–6 inclusive, I show a jet nozzle 120 which is mounted upon one end of a pressure-expansible bellows 122 which in turn is carried by a stationary bracket 124. The jet 120 is fed by a conduit 125 which is coiled as indicated at 126 to permit free movement of the jet nozzle 120 relative to the fixed bracket in response to expansion-contraction movements of the bellows 122. In turn the conduit 125 connects to one of the branch ports of the housing 78, as in the manner of the conduit 84 as shown in Figs. 1–6; and the bellows 76 and valve ball 102 and conduit 104, 105 are arranged within the casing 78 as in the manner of the arrangement of Fig. 6.

However, in the case of Fig. 7, the conduit 105 which leads to the conduit 108 and thence to the reject control mechanism is in communication with a supplementary branch conduit 127 which leads to the interior of the nozzle mounting bellows 122. Thus, it will be appreciated that the condition of the bellows 122 will be a function of the air pressure within the conduit 127 and will change with variances in the air pressure acting upon the reject mechanism as explained hereinabove. For example, when the balance beam 10 is in balanced or inoperative position, the gap between the beam 10 and the nozzle 120 will be such as to enable free escape of air through the nozzle 120 whereby the bellows 76 will be in contracted position. Hence, the valve ball 102 will be down, and full air pressure will be in the reject control cylinders 128 and 129 and in the bellows 122, thereby maintaining the nozzle 120 in its uppermost position as shown in Fig. 7. However, upon lowering of the beam 10 toward the nozzle 120, the air pressure force balance within the bellows 76 will be upset so as to cause the bellows 76 to expand to lift the valve ball 102. As explained hereinabove, this in turn causes the air pressure to be withdrawn from the reject control apparatus thereby permitting the reject apparatus to start to function. In the case of the apparatus of Fig. 7, however, this operation of the valve ball 102 also causes the air pressure within the bellows 122 to be relaxed, thereby permitting the nozzle 120 to retreat slightly ahead of the motion of the balance beam.

Thus, it will be appreciated that the nozzle 120 will to some degree "follow" the movement of the balance beam 10 whereby the rate of relative movement therebetween may be greatly reduced. This enables the apparatus to be utilized for progressively selective actuation of different elements such as are indicated at 128, 129 of a series of reject or weight control devices, in lieu of the single device 110 shown in Fig. 6, as explained heretofore. For example the preloading spring tension in control device 128 could be adjusted to less than the spring tension against control device 129, whereby the control devices are operative in response to different degrees of weight variation. Otherwise stated, successive increments of the relative motion between the balance beam and the retreating nozzle 120 may be employed to actuate successively the various members of a series of control devices, whereby the mechanism is adapted to produce a wide variety of selective control effects. Thus, for example, correct weight packages may be permitted to follow the normal production or No. 1 delivery line, while slightly underweight articles might be assigned to a No. 2 delivery line, while further underweight packages would be assigned to a No. 3 delivery line, and so on.

Figure 8:
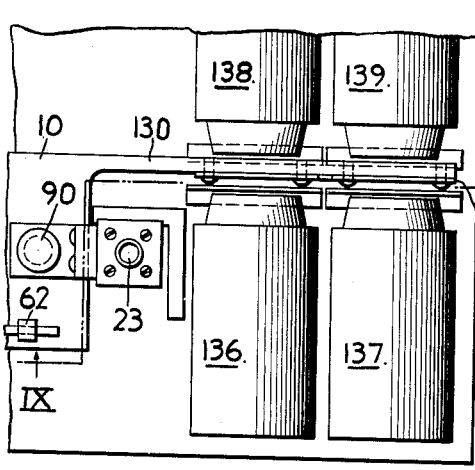
Fig. 8 is a fragmentary plan view of still another form of control mechanism such as may be used in connection with the invention.
Figure 9:
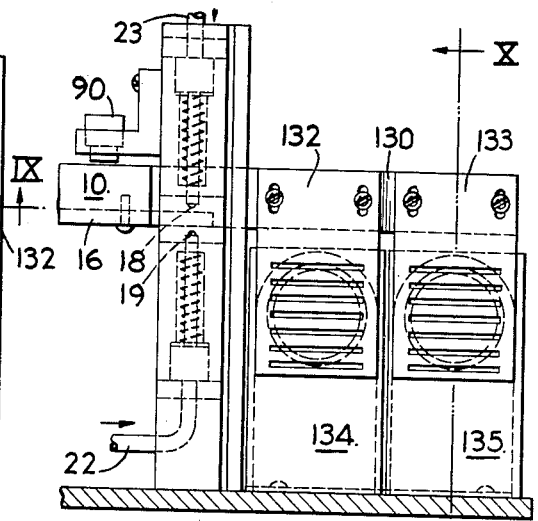
Fig. 9 is a fragmentary section taken along line IX—IX of Fig. 8.
Figure 10:
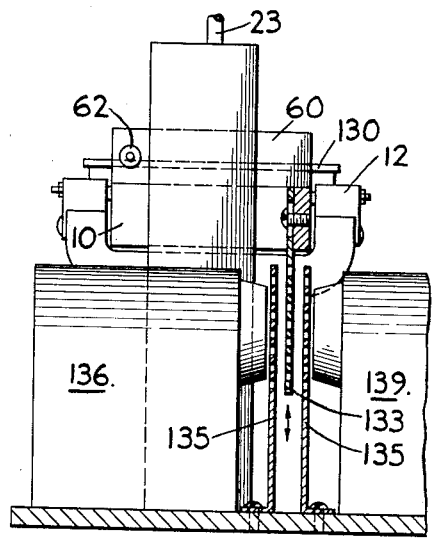
Fig. 10 is a fragmentary section taken along line X—X of Fig. 9.

Figs. 8–9–10 illustrate another form of underweight-overweight responsive control mechanism such as may be employed in conjunction with the apparatus of the invention. In this instance, the balance beam 10 is provided with an extension 130 upon which is suspended a pair of grid plates 132—133 (Figs. 9 and 10). Thus, upon release of the locking pins 18—19, as explained hereinabove the balance beam is free to pivot with consequent up or down movements of the grid plates 132—133 which are fixed to the balance beam. At either side of the grid plates 132—133 are disposed fixed paired grid plates 134—135; and lamp houses 136—137 are set at one side of each grid unit while an "electric eye" receiving unit 138—139 is set at the opposite side of each grid unit in registry with the direction of light projection from the lamp houses 136—137 respectively. Thus, it will be appreciated that the swinging movements of the balance beam in response to release of the locking pins 18—19 under either overweight or underweight conditions will result in movement of the center grid plates 132—133 so as to alternately cover and uncover the light openings through the fixed grids 134—135 so that the electric eye devices 138—

139 may be thereby energized; and that this energization of one of the electric eye devices may be employed to actuate through any suitable power amplification devices as are well known in the art the reject mechanisms for rejection of underweight articles, while the other "electric eye" may be employed to provide for rejection of overweight articles. Also, it will be appreciated that the degree of opening of the grids for passage of light therethrough as explained hereinabove will cause corresponding variations in the current delivered by the electric eye controlled power system, whereby such power variations may be employed to selectively actuate different members of a series of control devices, for the purpose of further segregating objects which deviate in varying degrees from the exact weight prescribed.

Thus, the invention features provision of a balance beam holding mechanism utilizing pressure force members which are also pressure-biased out of engagement when the holding pressure is released. This provides a mechanism which is operable with improved accuracy compared to devices of the prior art, because there is no possibility of lost motion or lag in the beam locking and unlocking operations. Also, it will be appreciated that the beam locking members move with simple straight line motions in directly opposed relation, and require no operation of driving means or the like intermediately of actual locking and unlocking actions. Consequently, the mechanism is at a standstill while the object weighing operation is in progress, and therefore vibrational or pulsing disturbances such as would be caused by rotating or reciprocating parts or the like are avoided. The invention also contemplates use of any other suitable means in lieu of the springs 55 for release of the holding pins, such as pneumatic pressure or other bias supply devices, or the like.

Also, it will be appreciated that the pneumatic nozzle arrangement of the invention for primary control of the reject mechanism provides a control arrangement which is of greatly improved sensitivity and reliability compared to devices of the prior art. This is because of the fact that the action of the air nozzle against the balance beam operates in effect as a valving device controlling the pneumatic pressure inside of the control bellows without intermediate use of mechanical linkages or contacting metal parts such as are subjected to wear and other inaccuracy producing tendencies. Thus, the invention contemplates use of any suitable air flow valve mechanism responsive to tilting of the balance beam, as the primary control element of the organization.

Thus, it will be appreciated that the check weighing machine of the invention comprises an extremely sensitive yet rapid operating mechanism which can be readily constructed to handle objects of widely different weights, wherein the balance beam is normally held in balanced or inoperative position by pneumatic pressure which is momentarily released upon arrival of an object into position to be weighed. Any tilting of the balance beam in response to an underweight or overweight condition then causes instantaneous operation of a mechanism to reject the underweight or overweight object from the normal delivery line, or to adjust the package filling or other weight controlling mechanism, as would be preferred. The mechanism consists of a minimum number of operative parts, and it is also a particular feature of the mechanism that the relatively minute motion of the balance beam in response to underweight or overweight conditions is in effect greatly magnified and if desired may be utilized in increments for selective actuation of successive reject or other control devices, so as to provide for various control effects proportional to very minute variations in the balance beam position.

It will of course be appreciated that whereas only a few forms of the invention have been shown and described in detail, it will be apparent to those skilled in the art that the invention is not so limited but that various changes may be made therein without departing from the spirit of the invention or the scope of the appended claims.

I claim:

1. An apparatus for check-weighing objects, said apparatus including a pivoted beam adapted to receive the objects in weighing position at one end of said beam, said beam being counterbalanced to the exact weight prescribed for said objects and therefore pivotable in response to underweight or overweight conditions, pneumatic pressure actuated holding means normally projecting to engage said beam to hold the latter in inoperative position means for supplying pneumatic pressure to said holding means, driven means arranged to control the supply of air to the pneumatic pressure means to sequentially release and restore said pneumatic pressure therein, means biasing said holding means toward beam released position upon release of said pneumatic pressure, pneumatic valve means having an air nozzle device controlling the valve means and directed against said beam for being throttled by pivoting motion of said beam upon release thereof in response to underweight or overweight conditions, and object reject means controlled by said valve means for rejection of underweight or overweight objects.

2. An apparatus for check-weighing objects delivered as from a production line, said apparatus including a balance member adapted to receive said objects singly, said balance member being counterbalanced to the exact weight prescribed for said objects and pivotable in response to underweight or overweight conditions, holding means comprising pneumatic pressure actuated members normally projecting from above and below said balance member to hold the latter in balanced position, means for supplying pneumatic pressure to said holding means, driven means arranged to control the supply of air to the pneumatic pressure means to sequentially release and restore said pneumatic pressure therein, spring means biasing said holding members toward balance member released positions upon release of said pneumatic pressure, valve means operated by motion of said balance member upon release thereof in response to underweight or overweight conditions, and object reject means controlled by said valve means for rejection of underweight or overweight objects.

3. An apparatus for weighing objects delivered thereto singly, said apparatus including a balance member having a weighing tray and being counterbalanced to the exact weight prescribed for said objects whereby said balance member is pivotable in response to underweight or overweight conditions, holding means comprising pneumatic pressure actuated members normally projecting to bear against directly opposed points on opposite sides of said balance member to hold the latter in inoperative position, means for supplying pneumatic pressure to said holding means, driven means arranged to control the supply of air to the pneumatic pressure means to sequentially release and restore said pneumatic pressure therein, means biasing said holding members toward balance member released positions upon release of said pneumatic pressure, valve means operated by motion of said balance member upon release thereof in response to underweight or overweight conditions, and object reject means controlled by said valve means for rejection of underweight or overweight objects.

4. An apparatus for check-weighing objects delivered as from a production line, said apparatus including a pivoted beam adapted to receive said objects singly in weighing position at one end of said beam, said beam being counterbalanced to the exact weight prescribed for said objects and therefore pivotable in response to underweight or overweight conditions, pneumatic pressure actuated holding means normally projecting to engage said beam to hold the latter in inoperative position, means for supplying pneumatic pressure to said holding means, driven means arranged to control the supply of air to the pneumatic pressure means to sequentially release and restore said pneumatic pressure therein, spring means biasing said holding means toward beam released position upon release of said pneumatic pressure, valve means operated by pivoting motion of said beam upon release thereof in response to underweight or overweight conditions, and object reject means controlled by said valve means for rejection of underweight or overweight objects.

5. An apparatus for check-weighing objects delivered as from a production line, said apparatus including a balance member adapted to receive said objects singly at one end thereof, said balance member being counterbalanced and pivotable in response to underweight or overweight conditions, holding means at the opposite end of said balance member comprising pneumatically actuated members normally projected from above and below said balance member into directly opposed engagement therewith to hold said balance member in balanced position, means for supplying pneumatic pressure to said actuating members, driven means arranged to control the supply of air to the pneumatic pressure means to sequentially release and restore said pneumatic pressure therein, release means associated with said pneumatic members and operable to bias said holding members toward balance member released positions upon release of said pressure, control means operated by motion of said balance member upon release thereof in response to underweight or overweight conditions, and object reject means controlled by said control means for rejection of underweight or overweight objects.

6. An apparatus for check-weighing objects delivered as from a production line, said apparatus including a pivoted beam adapted to receive said objects singly in weighing position at one end of said beam, said beam being counterbalanced to the exact weight prescribed for said objects and therefore pivotable in response to underweight or overweight conditions, pneumatic holding means normally projecting in opposed straight line motion to engage said beam to hold the latter in inoperative position, means for supplying pneumatic pressure to said holding means said means for supplying pneumatic pressure including driven means arranged to sequentially release and restore said pneumatic pressure, pneumatic valve means including an air nozzle device directed against and arranged to be throttled by pivoting motion of said beam upon release thereof in response to underweight or overweight conditions, and object reject means controlled by said valve means for rejection of underweight or overweight objects.

7. An apparatus for weighing objects, said apparatus including a balance member having a weighing tray and being counterbalanced to the weight prescribed for said objects, said balance member being pivotable about a predetermined axis in response to underweight or overweight conditions, pneumatic holding means at one end of said balance member comprising directly opposed retractable members normally projecting to bear against the top and bottom sides of said balance member to temporarily hold the latter in inoperative position, means for supplying pneumatic pressure to said holding means, said means for supplying pneumatic pressure including driven means arranged to sequentially release and restore said pneumatic pressure, control means operated by pivoting motion of said balance member about said axis upon release thereof in response to underweight or overweight conditions, and mechanism controlled by said control means for indication of underweight or overweight objects.

8. An apparatus for weighing objects, said apparatus including a balance member having a weighing tray adapted to receive said objects singly, said balance member being counterbalanced and pivotable in response to underweight or overweight conditions, pneumatic holding means comprising directly opposed elastic force actuated members normally projecting to bear against the top and bottom sides of said balance member to hold the latter in balanced position, means for supplying pneumatic pressure to said holding means, said means for supplying pneumatic pressure including driven means arranged to sequentially release and restore said pneumatic pressure, means operable to bias said holding members toward balance member released positions upon release of said elastic force thereof, control means operated by motion of said balance beam upon release thereof in response to underweight or overweight conditions, and means controlled by said control means for correction of the weight of the objects.

9. An apparatus for check-weighing objects delivered as from a production line, said apparatus including a balance member adapted to receive said objects, said member being balanced to the weight prescribed for said objects and pivotable in response to underweight or overweight conditions, pneumatic holding means comprising straight line retractable members normally projecting from above and below said balance member and elastic pressure forced into engagement therewith to hold said balance member in balanced position, means for supplying pneumatic pressure to said holding means, said means for supplying pneumatic pressure including driven means arranged to sequentially release and restore said pneumatic pressure, control means operated by motion of said balance member upon release thereof in response to underweight or overweight conditions, and object reject means controlled by said control means for rejection of underweight or overweight objects.

10. An apparatus for check-weighing objects, said apparatus including a scale member adapted to receive said objects, said scale member being balanced to the weight prescribed for said objects and movable in response to underweight or overweight conditions, pneumatic holding means comprising retractable pin members normally projecting from above and below said scale member and elastic pressure biased into engagement therewith to hold said scale member in zero position, means for supplying pneumatic pressure to said holding means, said means for supplying pneumatic pressure including driven means arranged to sequentially release and restore said pneumatic pressure, means biasing said pin members to retracted position upon such release of the pressure on said holding means to restore said scale member, control means operated by motion of said scale member upon release thereof in response to underweight or overweight conditions, and object reject means controlled by said control means for rejection of underweight or overweight objects.

11. An apparatus for check-weighing objects, said apparatus including a pivoted beam adapted to receive said objects singly in weighing position at one end of said beam, said beam being counterbalanced to the exact weight prescribed for said objects and therefore pivotable in response to underweight or overweight conditions, pneumatic holding means normally projecting in opposed straight line motion to engage said beam to hold the latter in inoperative position, means for supplying pneumatic pressure to said holding means, said means for supplying pneumatic pressure including driven means arranged to sequentially release and restore said pneumatic pressure, an air nozzle directed toward and arranged to be throttled by pivoting motion of said beam upon release thereof in response to underweight or overweight conditions, means mounting said air nozzle to permit movement thereof relative to said beam, means responsive to air pressure variations in said nozzle to control movement of said air nozzle relative to said beam, and object reject means controlled by said variations of pressure within said air nozzle for rejection of underweight or overweight objects.

12. An apparatus for weighing objects, said apparatus including a balanced member having a weighing tray at one end thereof and being counterbalanced to the weight prescribed for said objects, said balance member being pivotable in response to underweight or overweight conditions, pneumatic holding means comprising directly opposed members disposed at the opposite end of said balance member and normally projecting to bear against opposite sides of said balance member to hold the latter in inoperative position, means for supplying pneumatic pressure to said holding means, driven means arranged to control the supply of air to the pneumatic pressure means to sequentially release and restore said pneumatic pressure therein, air valve means operated by variation in air pressure arranged to be throttled by motion of said balance beam upon release thereof in response to underweight or overweight conditions, and mechanism controlled by said air valve means for rejection of underweight or overweight objects.

13. An apparatus for check-weighing objects, said apparatus including a pivoted beam adapted to receive said objects in weighing position at one end of said beam, said beam being counterbalanced to the exact weight prescribed for said objects and therefore pivotable in response to overweight or underweight conditions, pneumatic holding means normally projecting to hold said beam in inoperative position, means for supplying pneumatic pressure to said holding means, said means for supplying pneumatic pressure including driven means arranged to sequentially release and restore said pneumatic pressure, an air nozzle directed toward said beam and normally in spaced relation therefrom arranged to be throttled by pivoting motion of said beam upon release thereof in response to an incorrect weight condition, means mounting said air nozzle to permit movement thereof relative to said beam, means responsive to air pressure variations in said nozzle to control movement of said air nozzle relative to said beam, and object reject means controlled by said variations of pressure within said air nozzle for rejection of incorrect weight objects.

14. An apparatus for check-weighing objects, said apparatus including a pivoted beam adapted to receive the objects in weighing position at one end of said beam, said beam being counterbalanced to the exact weight prescribed for said objects and therefore pivotable in response to underweight or overweight conditions, fluid pressure actuated holding means normally projecting to engage said beam to hold the latter in inoperative position, means for supplying fluid pressure to said holding means, driven means arranged to control the supply of fluid to the fluid pressure means to sequentially release and restore said fluid pressure, means biasing said holding means toward beam released position upon release of said fluid pressure, fluid actuated valve means operated by pivoting motion of said beam upon release thereof in response to underweight or overweight conditions, and object reject means controlled by said valve means for rejection of underweight or overweight objects.

References Cited in the file of this patent

UNITED STATES PATENTS

| | | |
|---|---|---|
| 1,738,634 | Bryant | Dec. 10, 1929 |
| 2,050,496 | Mayo | Aug. 11, 1936 |
| 2,290,740 | Clewell | July 21, 1942 |
| 2,304,737 | Maeder | Dec. 8, 1942 |
| 2,357,783 | Snelling | Sept. 5, 1944 |
| 2,488,037 | Rupley | Nov. 15, 1949 |
| 2,628,055 | Knobel et al. | Feb. 10, 1953 |